United States Patent
Peck et al.

(10) Patent No.: US 7,266,705 B2
(45) Date of Patent: Sep. 4, 2007

(54) SECURE TRANSMISSION OF DATA WITHIN A DISTRIBUTED COMPUTER SYSTEM

(75) Inventors: Adrian Peck, Cambs (GB); Ian Harvey, Cambs (GB)

(73) Assignee: nCipher Corporation Limited, Cambridge (GB)

( * ) Notice: Subject to any disclaimer, the term of this patent is extended or adjusted under 35 U.S.C. 154(b) by 655 days.

(21) Appl. No.: 10/665,744

(22) Filed: Sep. 19, 2003

(65) Prior Publication Data

US 2005/0027979 A1    Feb. 3, 2005

(30) Foreign Application Priority Data

Jul. 29, 2003   (GB) ................... 0317742.5

(51) Int. Cl.
*G06F 9/00* (2006.01)

(52) U.S. Cl. ............... 713/193; 713/161; 713/168; 713/171; 713/182

(58) Field of Classification Search ............. 713/193, 713/161, 168, 171, 182
See application file for complete search history.

(56) References Cited

U.S. PATENT DOCUMENTS

| | | | |
|---|---|---|---|
| 3,263,158 A | * | 7/1966 | Bargen et al. ............. 323/263 |
| 3,609,697 A | * | 9/1971 | Blevins et al. ............. 717/106 |
| 6,912,656 B1 | | 6/2005 | Perlman et al. |

FOREIGN PATENT DOCUMENTS

| | | |
|---|---|---|
| GB | 2 372 921 A | 9/2002 |
| WO | WO 01/41353 A2 | 6/2001 |

* cited by examiner

*Primary Examiner*—Thomas R. Peeso
(74) *Attorney, Agent, or Firm*—Morgan & Finnegan LLP

(57) ABSTRACT

A method for the secure transmission of data from a distributor to a client over a computer network. The method includes encrypting the data using an encryption confidentiality key known to the client, but not the distributor. The method also includes storing the encrypted data at the distributor and generating a message by further encrypting the encrypted data using an encryption transmission key. The corresponding transmission decryption key is also known by the client. Also, the method includes transmitting the generated message to the client.

70 Claims, 14 Drawing Sheets

Steps 4. and 6. when retrieving Data
from Data Set 1 (DS1) for Entity, Name 1 (N1)

SECURE TRANSMISSION OF DATA WITHIN A DISTRIBUTED COMPUTER SYSTEM

The present invention relates to the secure transmission of data within a distributed computer system, particularly although not exclusively to facilitate secure communication with client devices on a network.

While the invention may be utilised in all types of network-aware devices, it is expected to find particular application in fields such as network cards, wireless LAN cards, voice over IP telephones, modems, routers, switches, hubs, TV set-top boxes, mobile telephones and the like.

Traditionally, suppliers of network devices, and particularly consumer devices, have tended to accord a relatively low priority to the implementation of security by means of encryption. Although cryptographic systems can in some cases be added on to pre-existing networks, either by means of software or by means of purpose-designed hardware security modules, such solutions are often expensive and complex to implement. Some progress has been made in consumer markets by allowing the protection of cryptographic keys in smart cards or in hardware boxes, but both of these approaches are of rather limited scope. A more recent trend is toward the increasing "hardening" of client devices, with cryptography being built in as a fundamental part of the messaging protocols to be used. Unfortunately, suitably powerful embedded processors capable of carrying out the full range of cryptographic functions, including key generation, are by no means cheap, so discouraging the use within inexpensive consumer products.

Many current systems rely on Public Key Infrastructure (PKI) in order to verify the integrity of data transmitted across the network. While this normally works well, it does have a number of disadvantages, the most important of which for the purpose of the present application is that since there is typically no close link between the issuer of a PKI certificate and the party relying on that certificate. There can thus be significant delays between a certificate being revoked and the reliant party learning about the revocation.

According to the present invention there is provided a method for the secure transmission of data from a distributor to a client over a computer network, the method comprising: encrypting the data using an encryption confidentiality key known to the client but not the distributor; storing the encrypted data at the distributor, generating a message by further encrypting the encrypted data using an encryption transmission key, the corresponding transmission decryption key being known to the client, and transmitting the message to the client.

According to a second aspect of the invention there is provided a computer security module having means for receiving from a sender a message comprising twice-encrypted data, means for confirming the integrity of the message by decrypting it according to a protocol known to both the module and the sender, and means for confirming that the confidentiality of the data has been preserved by further decrypting the decrypted message using a secret known to the module but not to the sender.

According to another aspect of the present invention there is provided a method for the secure transmission of data to a client, over a computer network, the method comprising: providing, at a remote data distributor, encrypted data the decryption of which requires knowledge of a secret known to the client, opening a secure channel between the distributor and the client, the channel defining a cryptographic protocol agreed by both the distributor and client, at the distributor, further encrypting the encrypted data according to the protocol to generate a secure message, and transmitting the message to the client, and at the client: confirming the integrity of the transmission by decrypting the message according to the protocol, and recovering the data by decrypting the encrypted data using the secret.

The invention, in its various forms, allows us:
 (a) To define a form of Secure Processor and Associated functions and protocols, which is designed to minimize its physical and computations resources by offloading functions to another Secure Processor that services it.
 (b) To define a framework of networked Secure Processors of that type that provides centralized storage, processing and distribution.
 (c) To define such a framework to support Policies that execute in Secure Processors that automate the enforcement of rules on the processing and distribution.
 (d) To define such a framework that allows separation of trust, including confidentiality and integrity, between parts of the framework.

The invention further extends to a computer system including a plurality of clients, each having a security module as previously defined and a provider arranged to send messages as required, to the said clients.

The invention may be carried into practice in a number of different ways and a variety of embodiments will now be described, by way of example with reference to the accompanying drawings, in which.

Figure 9:
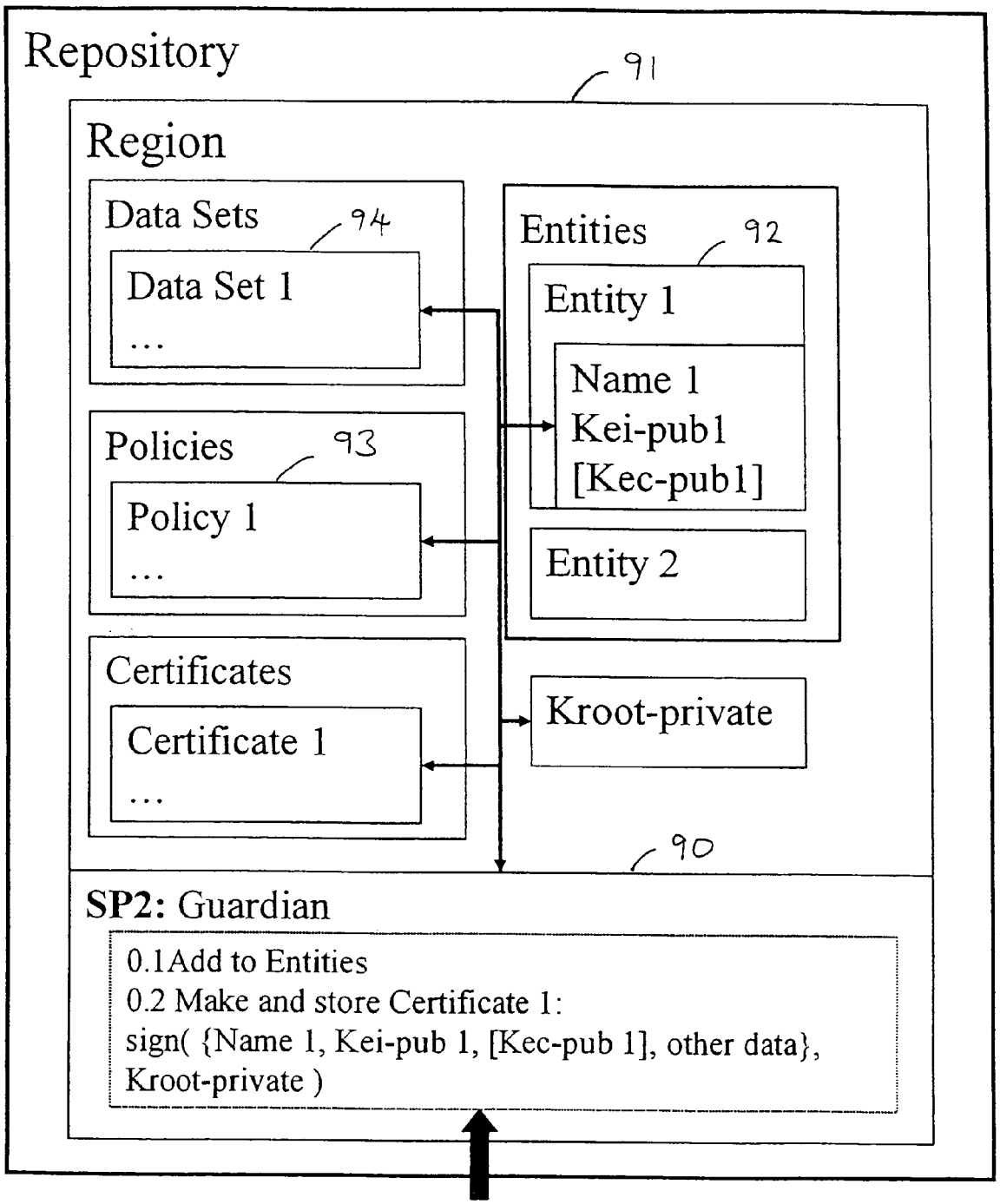
Figure 10:
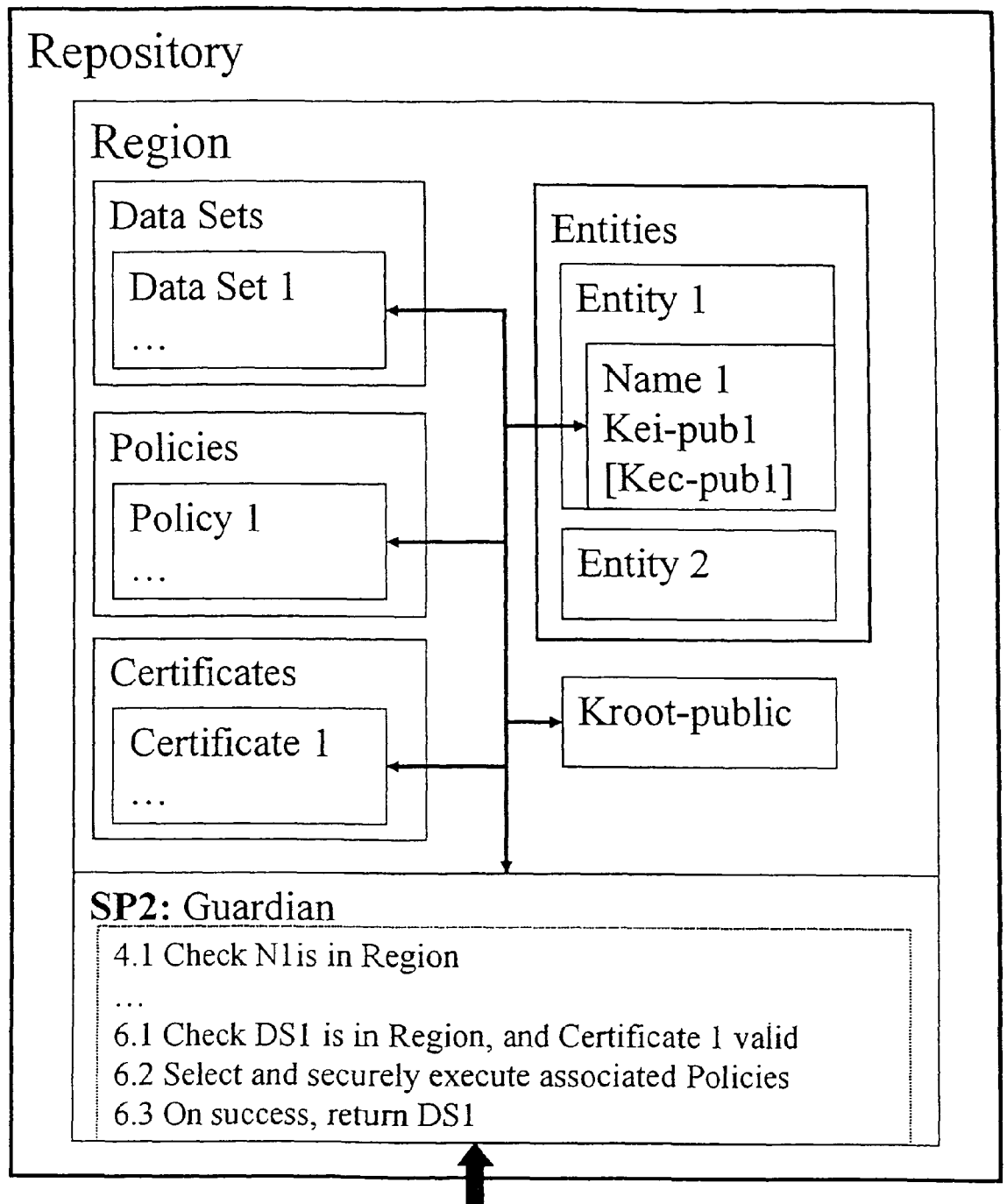
Figure 11:
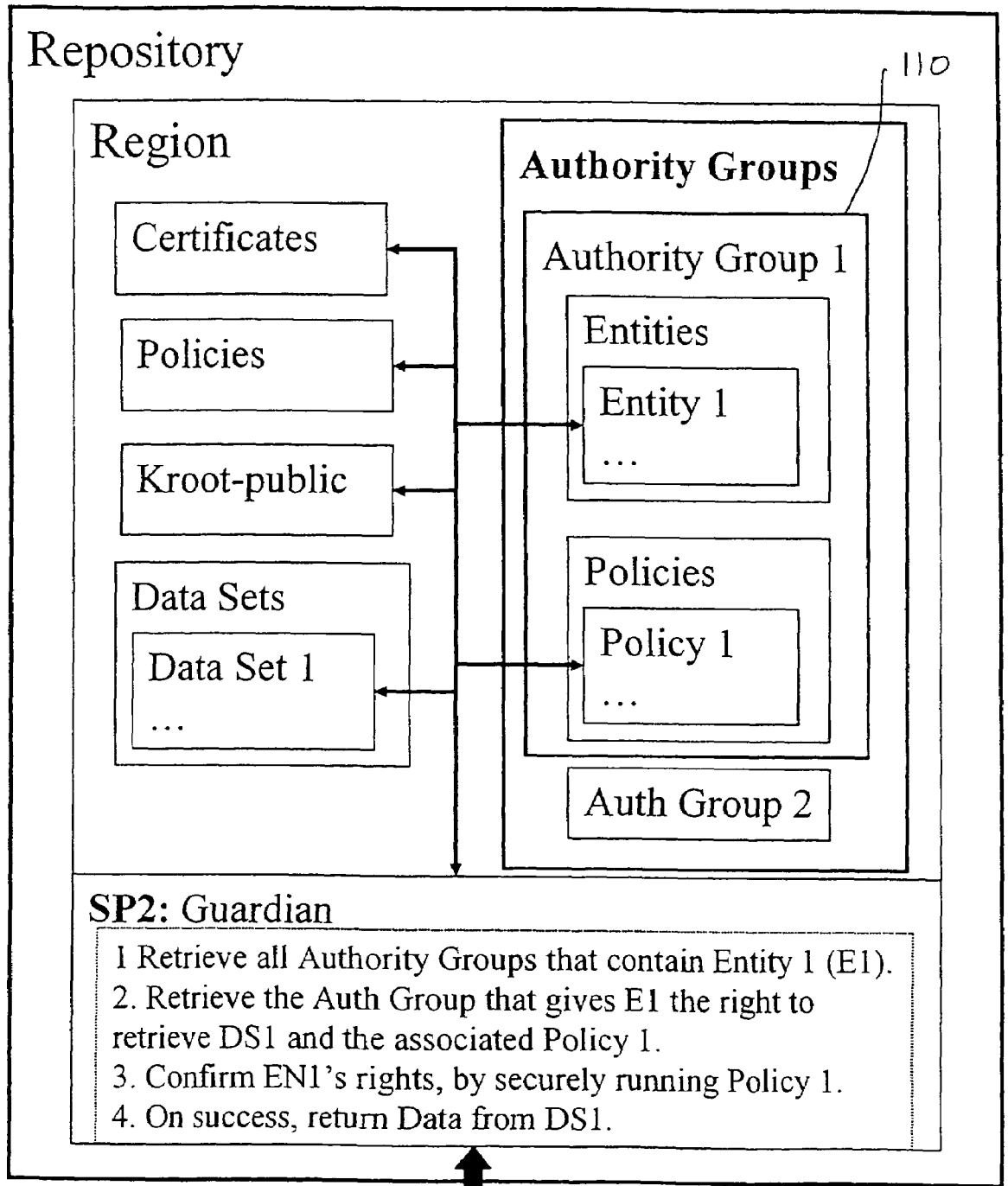
Figure 12:
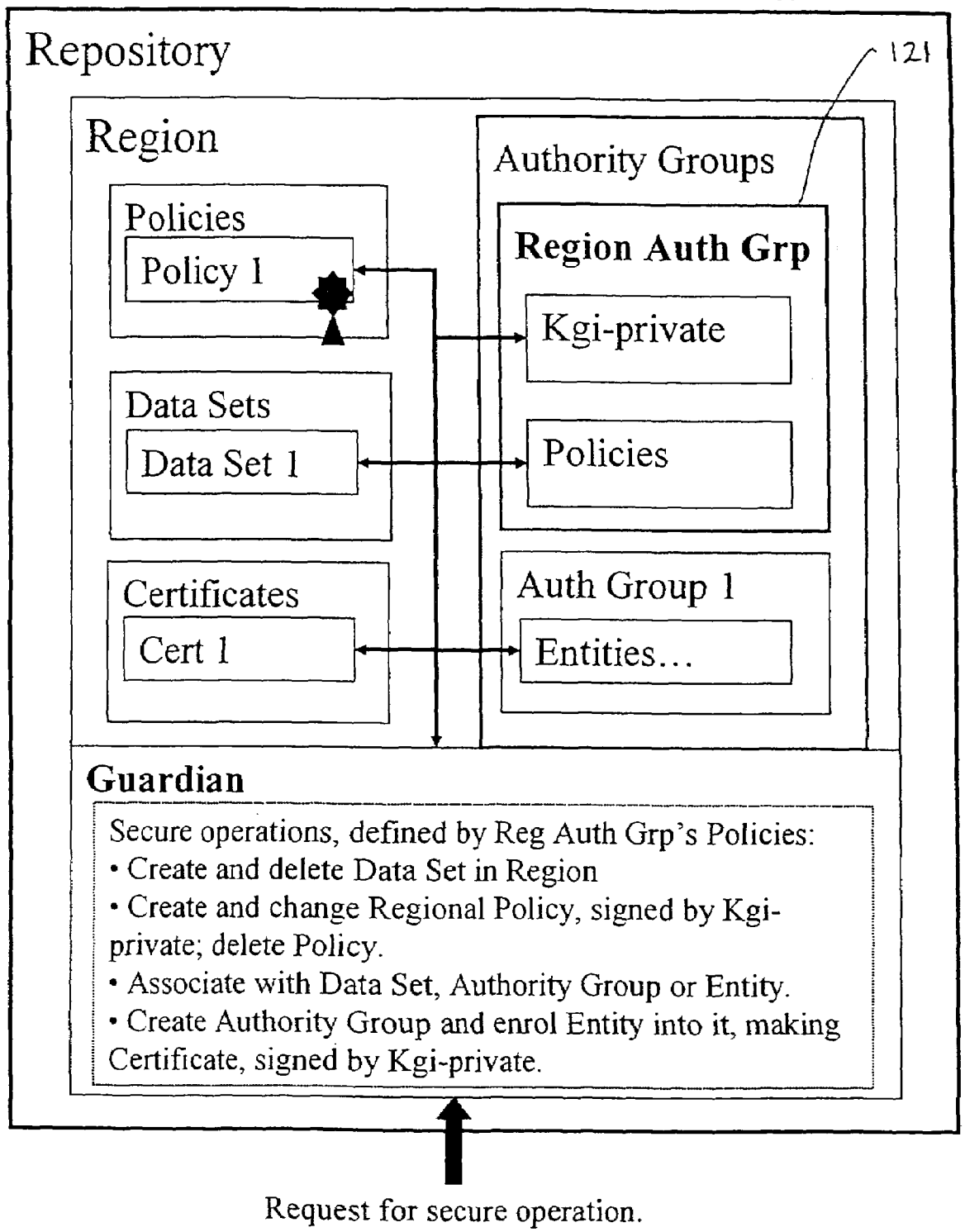
Figure 13:
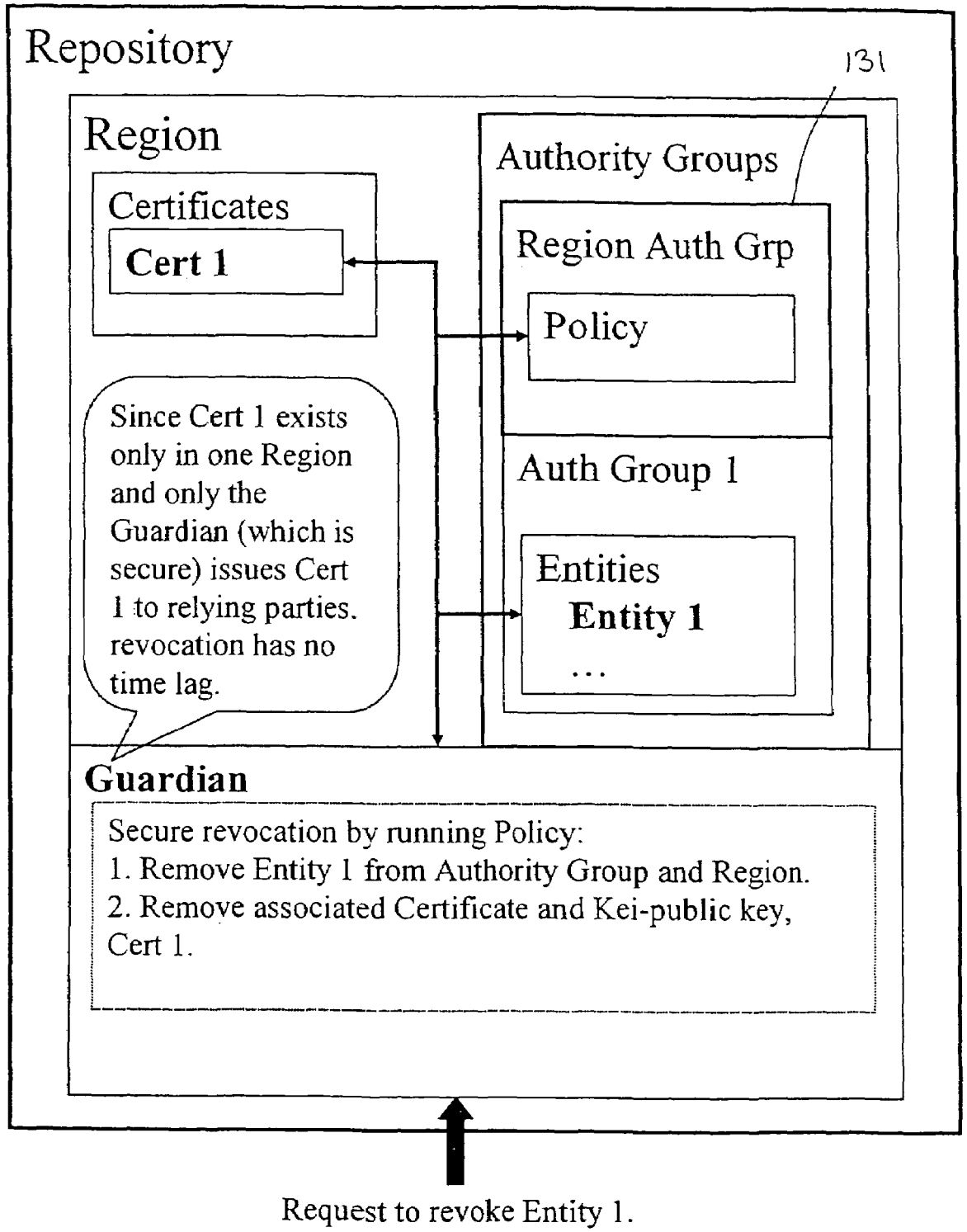

FIG. 9 introduces the concept of the region;

FIG. 10 shows how data-sets, policies, certificates and secure entities may be stored within each region;

FIG. 11 introduces the authority group;

FIG. 12 introduces the region authority group;

FIG. 13 shows how an entity in a region may be revoked; and

Figure 14:
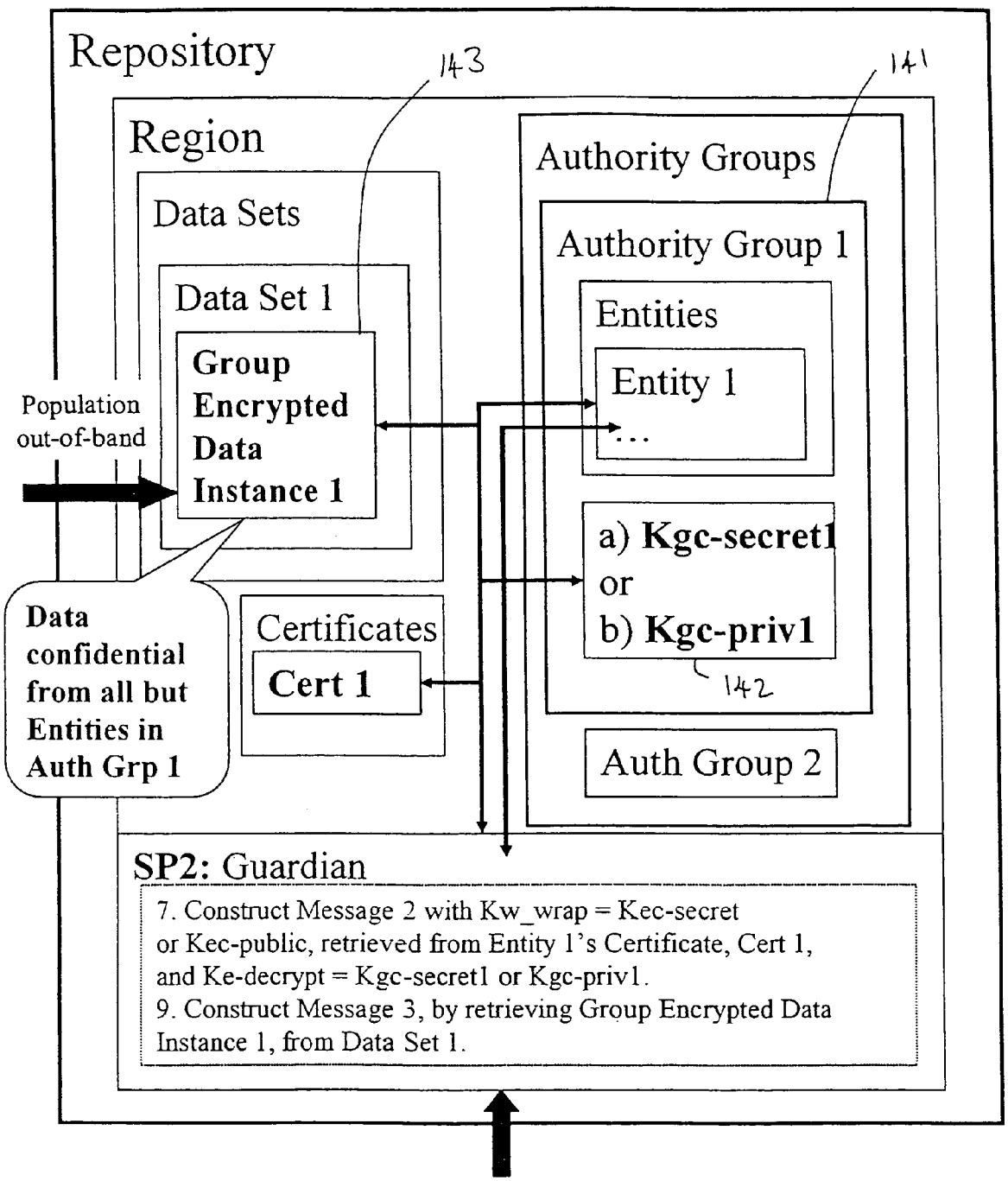

FIG. 14 illustrates confidentiality within groups.

1. FIRST SCENARIO

In this section we define a novel form of Secure Processor and associated functions and protocols, which is designed to minimise physical and computations resources by offloading functions to another Secure Processor that services it. We shall call this novel Processor a Micro-HSM.

1.1 Secure Processor Definitions

Figure 1:
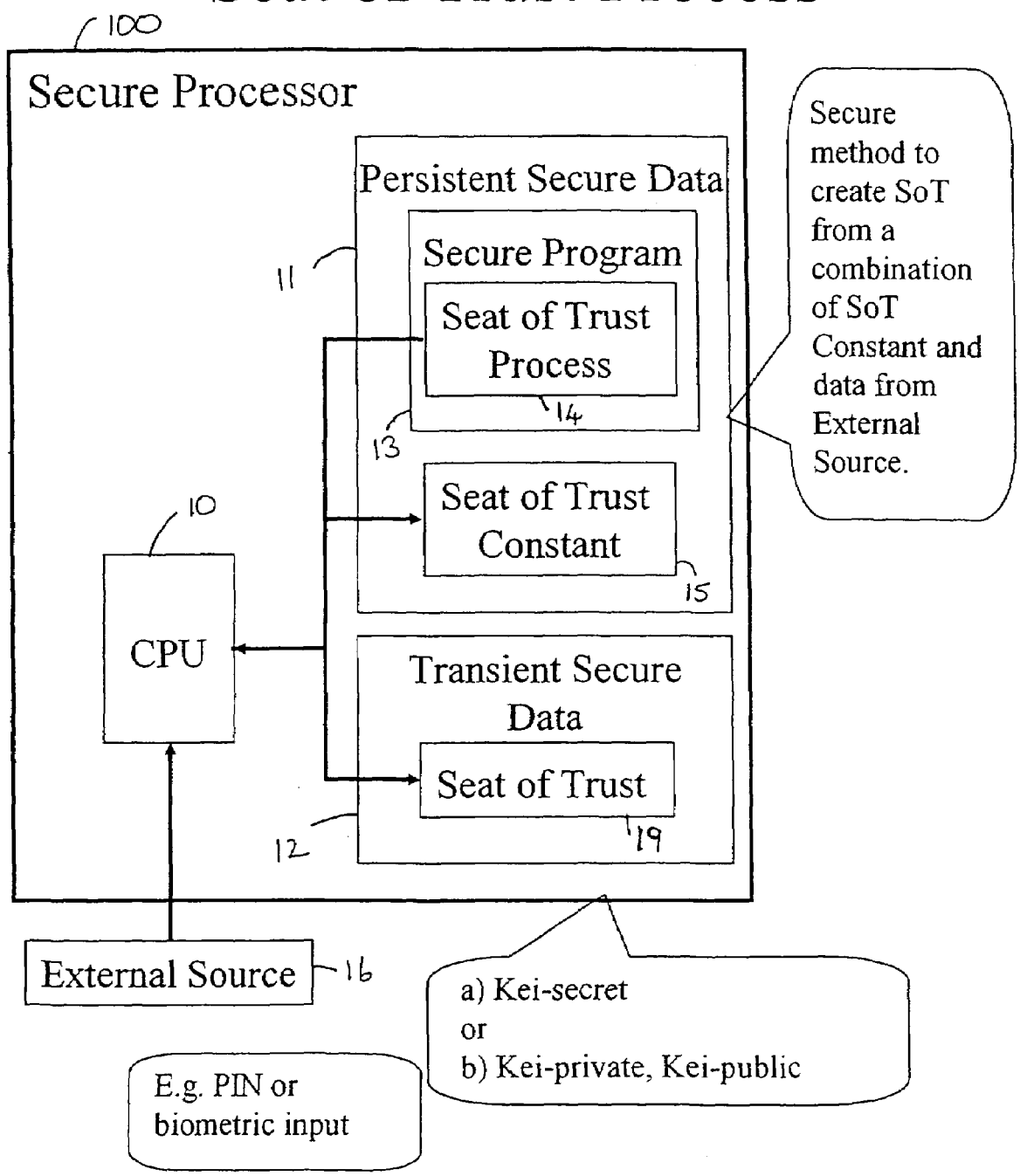
FIG. 1 illustrates a seat of trust process, known in the prior art.

For the purpose of definition, a Secure Processor 100 of known generic type, as shown in FIG. 1, comprises:
 a CPU 10;
 Persistent Secure Data 11, which is information stored long-term, for example, using technologies such as ROM and/or EEPROM;

Transient Secure Data 12, which stores data only when the CPU is active, for example, using technologies such as RAM, and in particular such data cannot be expected to persist over power downs.

A Secure Processor has one or more Secure Program(s) 13, which are stored in its Persistent Secure Data 11 and can execute on its CPU 10, when it can store and access Persistent Secure Data 11 and Transient Secure Data 12, and, potentially, other resources, such as a secure clock (not shown).

An Insecure Computer can run Insecure Programs that can communicate with a Secure Processor.

In contrast to an Insecure Program, the integrity of a Secure Program and the integrity and confidentiality of its execution on its Secure Computer is regarded as trustworthy.

The Secure Computer 100 is typically a dedicated hardware module, such as an HSM (Hardware Security Module), a smart card, specialist embedded device or a physically protected chip, which is typically secured by a combination of physical and logical mechanisms.

The Insecure Processor is typically a personal computer, server computer or appliance, network device (such as a router), mobile computing device, such as a mobile phone or palmtop.

In some cases, the Secure Computer can exist without needing an Insecure Computer.

1.2 Micro Secure Processor

A particular (novel) class of Secure Processor is the 'Micro Secure Processor' or micro HSM which is designed to minimize the physical and computational resources it needs by offloading functions to one or more connected Secure Processors. Each may typically service a set of Micro Secure Processors. For example, a Micro Secure Processor, SP1, might perform cryptographic processes on a Key, but request that Key from SP2 each time it is used, thereby relying on SP2 to perform key management functions, potentially including generation, backup, retrieval, archive and key rolling.

Also, since it requests the Key when it needs to use it, the Micro Secure Processor requires less Secure Persistent Storage than it would if it stored the Key.

1.3 Secure Transfer Protocol

One Secure Processor ('SP1') can communicate with another Secure Processor ('SP2') using a 'Secure Transfer Protocol', which allows SP1 to request some data from SP2. The connection between SP1 and SP2 may involve one or more Insecure Computers. SP1 could be a Secure Processor or a Micro Secure Processor.

The Secure Transfer Protocol is designed so that the insecure parts of this system do not compromise the security of the exchange.

The connections between SP1 and SP2 can be permanent or intermittent. It can use wired or wireless networks, or a mixture of both.

1.4 Data

The Data transmitted by the Secure Transfer Protocol could contain:
  a) Key Data, which describes a cryptographic key ('Key') that SP1 can use securely;
  b) Program Data, which is a program that could run securely on SP1, or be loaded to run on an Insecure Computer that is directly associated with SP1;
  c) Other Data, which is general information that SP1 requires and which must be treated with high levels of security.

For example, Other Data could include:
configuration information that is required to determine or check the state or integrity of SP1, or associated Insecure Computers;
configuration information that is used by some Secure Program;
license information that defines the conditions under which some other data or program may legitimately be used by SP1 or associated Insecure Computers.

1.5 Seat of Trust

As shown in FIG. 1, a Secure Processor 100 stores, or can securely obtain a value, or set of values, called the 'Seat of Trust', which allows another Secure Processor to authenticate it, and which can enforce the integrity of objects under its control.

A Secure Processor that can be so authenticated by another Secure Processor is called an 'Entity'.

The Seat of Trust is implemented using an 'Entity Integrity Key' (Kei):
  either
  a) a symmetric key ('Kei-secret') or;
  b) an asymmetric key pair comprising 'Kei-private' and Kei-public.

An entity can authenticate itself, or enforce integrity, to another Secure Processor using:
  a) Kei-secret to form a Message Authentication Code (MAC) or;
  b) using Kei-private to make a digital signature.

1.6 Seat of Trust Processes

As shown in FIG. 1, a 'Seat of Trust Process' 14 can generate the Seat of Trust 19 from one or more 'Seat of Trust Constant'(s) 15, each of which can be:
  a) Persistent Secure Data 11 (e.g. inserted by the device manufacturer);
  b) supplied to the Secure Processor from some external source 16, for example, a person entering a Personal Identity Number ('PIN'); or from a biometric mechanism that encodes some personal property as a Seat of Trust Constant.

1.7 Simple Enrollment

Before SP2 can authenticate SP1, or rely on its statement of integrity, SP2 must receive:
  a) Kei-secret or;
  b) Kei-public.

We call this process 'Enrolling'.

Enrolling is assumed to take place in an out-of-band process that preserves security, in particular, the confidentiality of Kei-secret, and the integrity of a) Kei-secret or b) Kei-public's unique association with SP1.

1.8 Secure Transfer Protocol (1)

Figure 2:
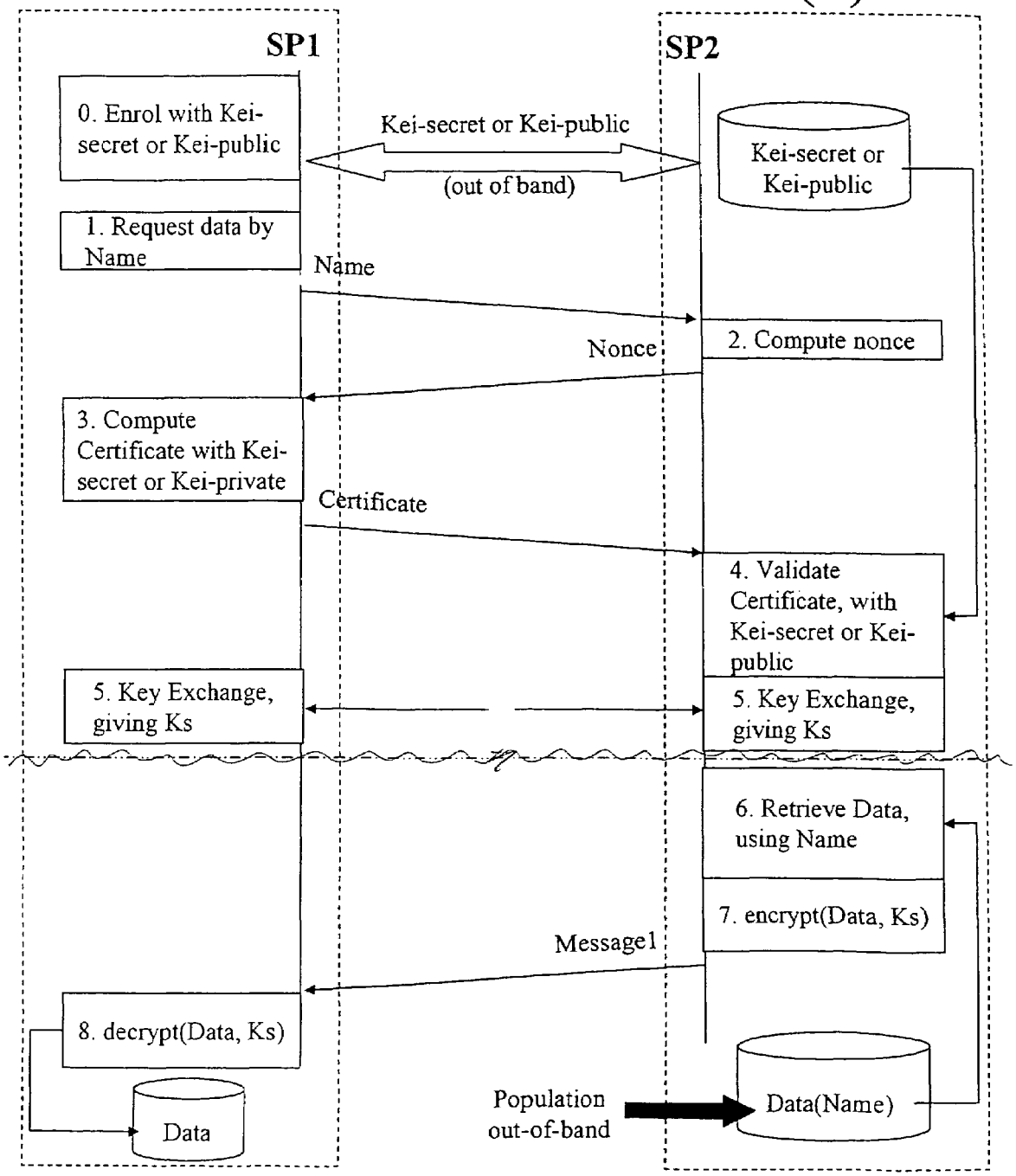
FIG. 2 illustrates a known secure transfer protocol, again known per se in the prior art.

Turning now to FIG. 2, one process by which SP1 requests Data from Secure Processor SP2 is as follows:
  0. SP1 Enrolls with SP2, using an out-of-band process.
  1. SP1 sends a message to SP2 to request Data by its 'RequestedName', which identifies it.
  2. SP2 replies with a 'Nonce', which is a random challenge.
  3. SP1 computes a 'Certificate'
  either:
    a) mac( {Nonce, other data}, Kei-secret ) where 'mac (e, f)', means 'MAC e using key f'.
  or:
    b) sign( {Kei-public, Nonce, other data}, Kei-private) where '{a, b}' denotes 'a concatenated with b' and 'sign(c, d)', means 'sign c using key d'

Then SP1 sends the Certificate to SP2.

4. SP2 verifies the Certificate and the value of Nonce, by either:
   a) mac( Certificate, Kei-secret)
   or;
   b) verify( Certificate, Kei-public)
   where 'verify(a,b)' means 'verify a using key b'.
   and checks that the value of the Nonce in the Certificate is that same as that created by SP2 in Step (1.).
   4.1) If this succeeds, proceed to Step (5.).
   4.2) If this does not succeed, the transfer terminates with an error and goes to Step (9.).
5. SP1 and SP2 exchange messages that result in a shared 'Session Key', ('Ks').

Step (5.) could use one or a set of well known mechanisms, such as Diffie-Hellman key exchange.

6. SP2 retrieves the Data that corresponds to RequestedName.
7. SP2 computes 'Message1'
   encrypt({Data, other data}, Ks)
   where 'encrypt(a,b)' denotes 'encrypt a using key b', and sends Message1 to SP1.
8. SP1 obtains Data, by decrypting Message1:
   decrypt( Message1, Ks )
   where 'decrypt(a, b )' denotes 'decrypt a using key b'.
9. End Another variant (not shown) is where Data is transferred in more than one piece by iterating Steps (7.) and (8.). Yet another variant is where Step (1.) requests more than one piece of Data.

1.9 Secure Transfer Protocol (2)

Figure 3:
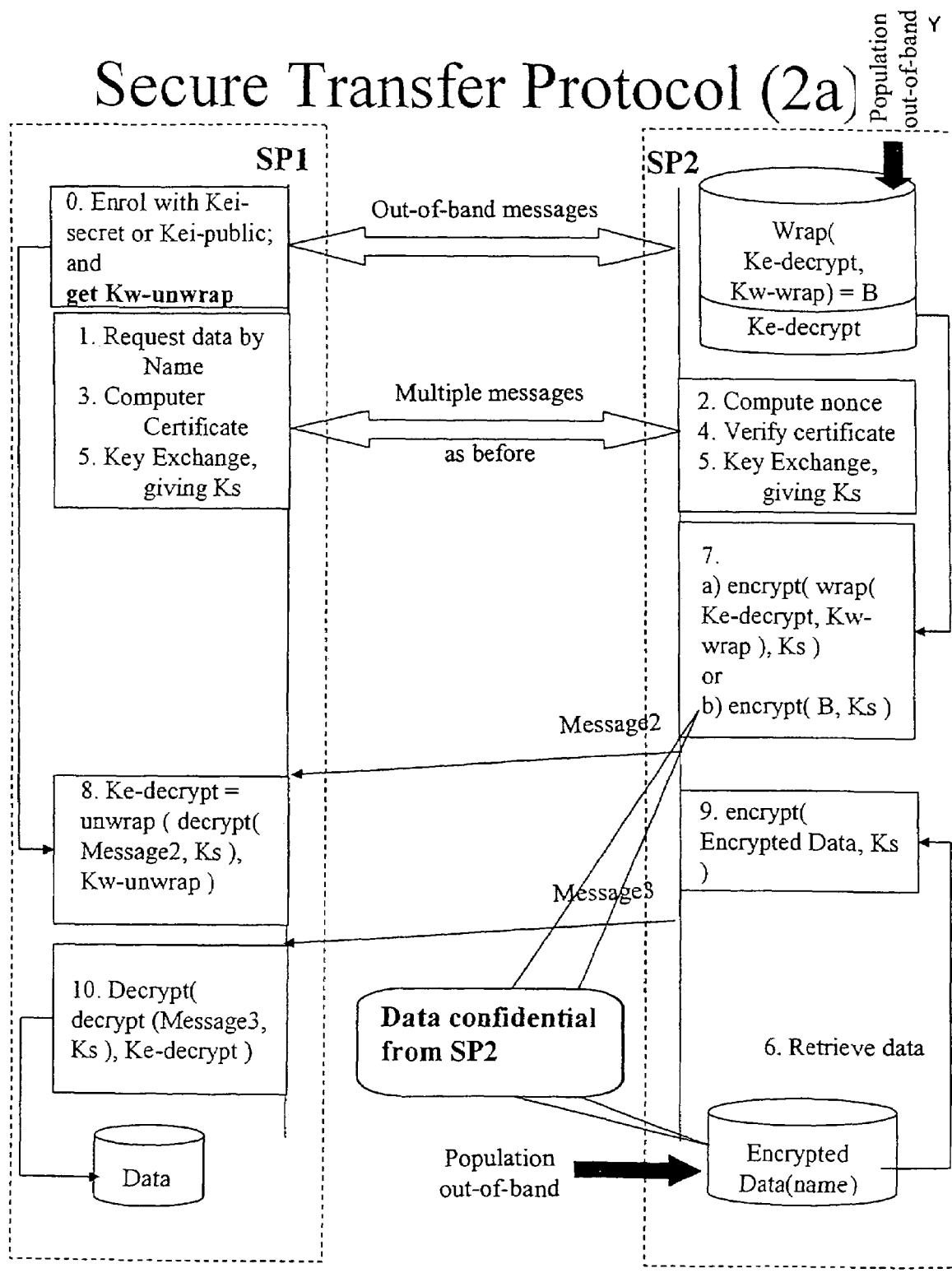
FIG. 3 shows a first secure transfer protocol according to an embodiment of the present invention.

We turn now to FIG. 3. Another variant of the Secure Transfer Protocol is where Data is stored encrypted by encryption key 'Ke-encrypt' as 'Encrypted Data':
   encrypt({Data, other data}, Ke-encrypt).

This double-encryption concept allows the system to make a distinction between the security involved in distributing Data (e.g. a key) and in the use of that Data. The message being passed allows the recipient to rely on the confidentiality of the data that is being distributed and, entirely separately, to rely on the integrity of the distribution process itself. Provided that the secret known to the client (SP1) is kept confidential from the distributor (SP2), the client can be sure that the confidentiality of the Data is preserved. There is a one to one relationship between the secret within the client micro HSM and the confidentiality of the distributed data.

One major advantage of such an arrangement is that the privacy of the private key needed to read the original data can be maintained entirely outside the system. The private key can be kept securely in one place (for example in the head office of a company), with the job of key-distribution being outsourced elsewhere. The company doing the key distribution does not need to be trusted so far as the privacy of the data is concerned, since it has no access to that; it needs to be trusted only as to the integrity of the distribution process.

Steps (0.)-(5.) are the same as in (1.8), and these steps then follow:

6. SP2 retrieves the Encrypted Data that corresponds to RequestedName.
7. SP2 computes 'Message2', using:
   either:
   a) a wrapping key, 'Kw-wrap'.
      encrypt(wrap({Ke-decrypt}, Kw-wrap), Ks)
   where 'wrap(a,b)' denotes 'wrap key a with key b' and 'Ke-decrypt' is the decryption key corresponding to Ke-encrypt
   or;
   b) by retrieving wrap({ke-decrypt}, Kw-wrap )='B' and computing Message2 as
      encrypt( B, Ks)
   In this case, SP2 received B in some out of band, secure process, which keeps ke-decrypt confidential from SP2.
   And then, SP2 sends Message2 to SP1.
8. SP1 obtains Ke-decrypt by unwrapping Message2 with the corresponding unwrapping key, 'Kw-unwrap', which SP1 obtained from some out of-band-process
   unwrap( decrypt (Message2, Ks ), Kw-unwrap)
9. SP2 computes 'Message3'
   encrypt(Encrypted Data, Ks)
   and sends it to SP1
10. SP1 obtains Data, by decrypting Message3:
    decrypt(decrypt (Message3, Ks ), Ke-decrypt)
    where 'decrypt(a, b )' denotes 'decrypt a with key b'.

Figure 4:
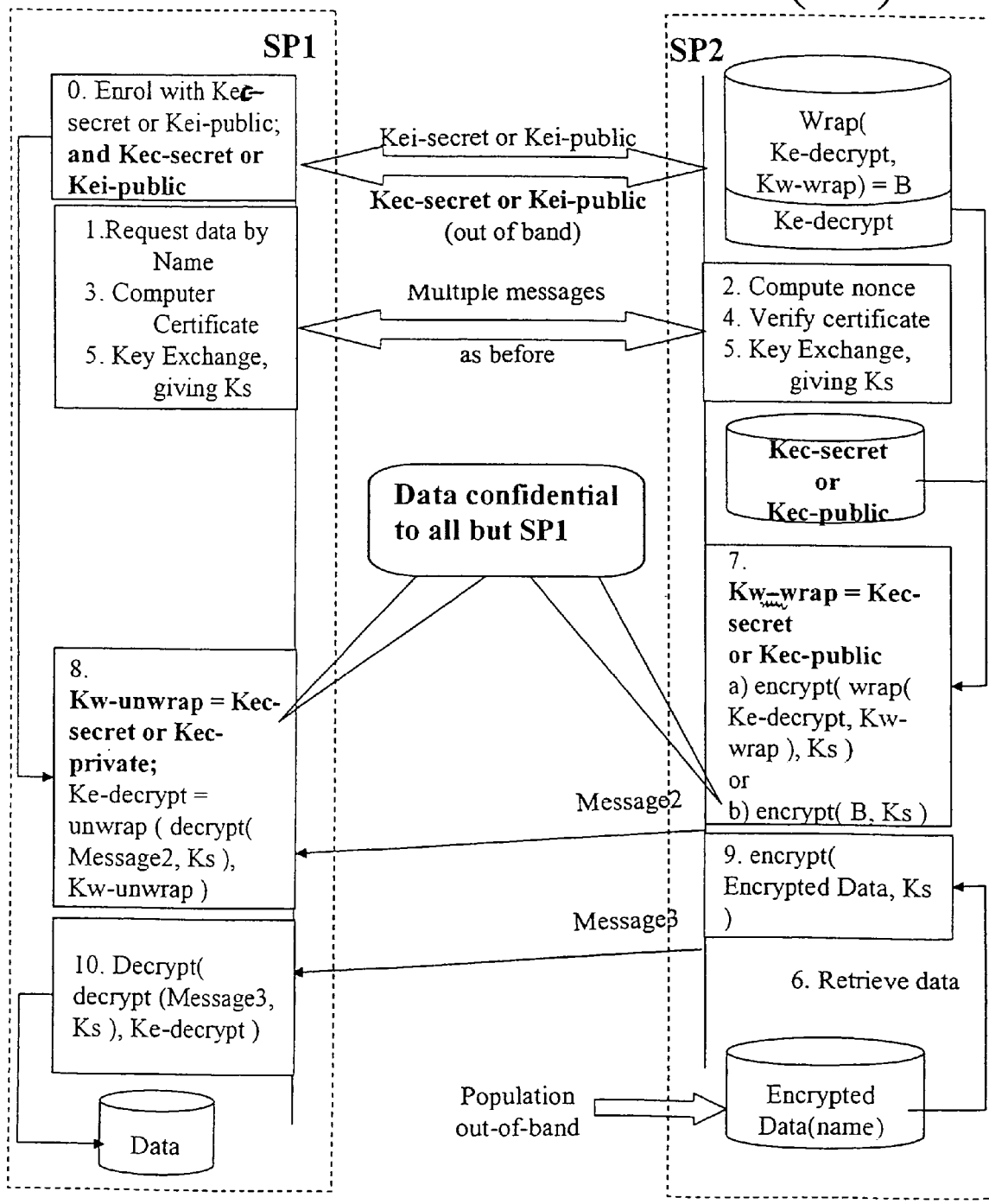
FIG. 4 shows an alternative secure transfer protocol.

Another variant is where a nested set of unwrapping keys are transferred in steps essentially similar to (7.) and (8.). This could be done recursively 1.10 Wrapping Key One case of the protocol in (1.8), shown in FIG. 4, is where SP1 has an Entity Confidentiality Key (Kec):
   either
   a) a symmetric key, 'Kec-secret'
   or;
   b) an asymmetric key pair: 'Kec-private' and 'Kec-public'.

And SP1 securely transfers Kec-secret or Kec-public to SP2 during the Enrolling process.

Then Kw-wrap is either a) Kec-secret or b) Kec-public and Kw-unwrap is either a) Kec-secret or b) Kec-private.

2. SECOND SCENARIO

In this section we define a framework of networked Secure Processors that generalizes scenario 1. enabling centralized storage, processing and distribution.

2.1 Repository, Provider, User

Figure 5:
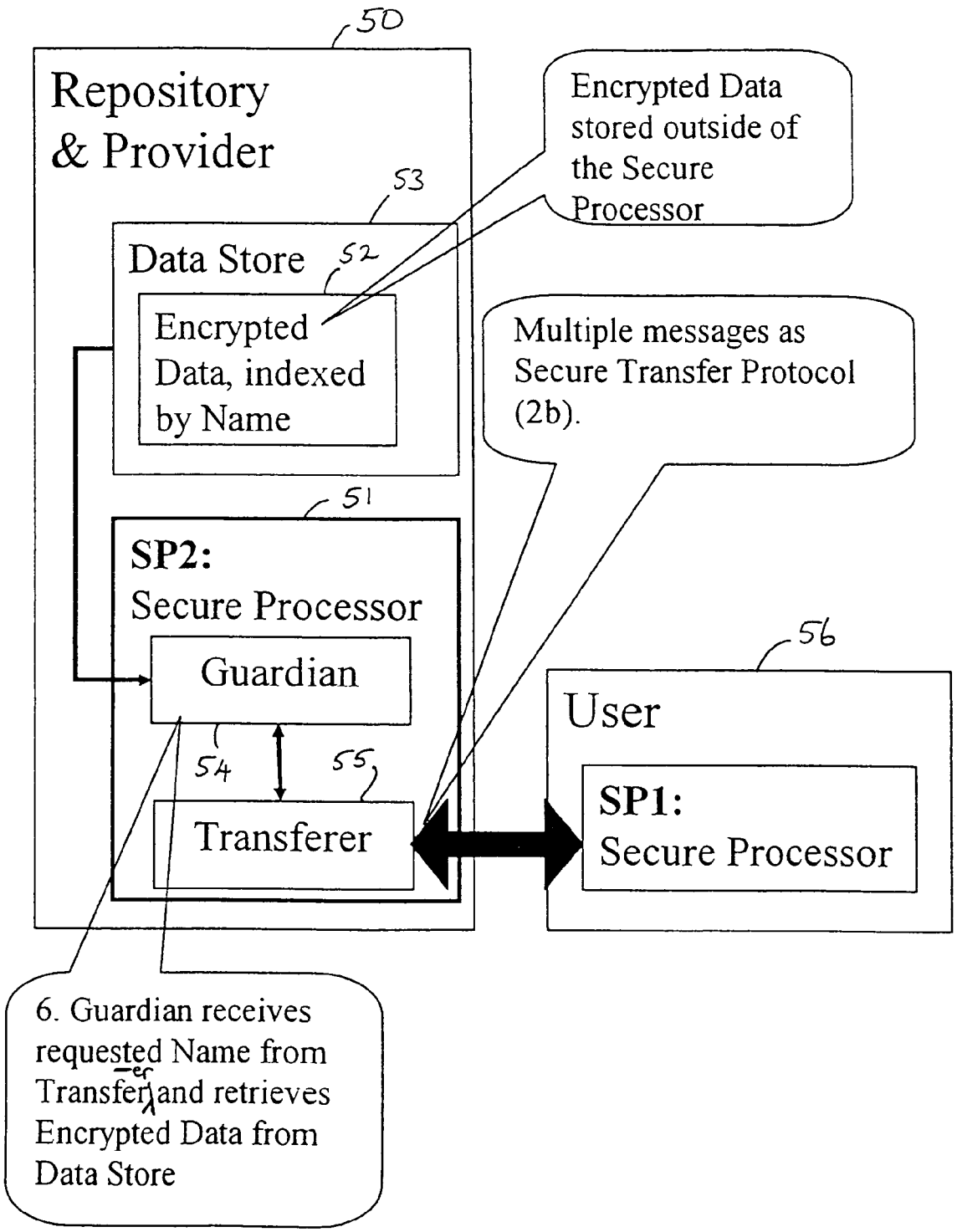
FIG. 5 illustrates the use of a repository and provider.

Turning next to FIG. 5, there is shown a network of Secure Processors and Micro Secure Processors as follows:

A Repository 50, which centralizes the storage of encrypted Data 52 within a data store 53 and may originate that Data or receive it from some out-of-band mechanism.

The Repository comprises at least one Secure Processor 51 or an Insecure Computer interfaced with at least one Secure Processor.

The Secure Program responsible for the Repository's activities is called the Guardian 54. This communicates with a Transferrer 55.

In one configuration, as shown in FIG. 5, the Repository and Provider are merged into one component. Alternatively, the Repository may communicate with one or more Provider(s), using the Secure Transfer Protocol.

Each Provider is responsible for serving Data on request to one or more User(s) 56, each of which requests and may use Data.

The Transferrer 55 communicates with the User 56 using the Secure Transfer Protocol.

Both the Provider and the User contain a Micro Secure Processor or a Secure Processor, typically interfaced to an Insecure Computer (not shown).

Providers allow for essentially arbitrary scaling to large numbers of Users and for physical and logical partitioning of distribution of data to multiple Users. In one preferred embodiment, the network structure may comprise three levels: a repository acting as a micro HSM to several providers, with each provider itself acting as a micro HSM to several users. It will be understood, of course, that more levels would be possible, as would replication and redundancies at any individual level.

To improve network performance, and to avoid the need for a request to pass all the way up to the top of the tree whenever an individual user requests a new key, caching may be provided at some or all of the levels. Such a structure provides for lifecycle management of the data (for example key lifecycle management). It permits for localisation of policy but distribution of use.

2.2 Secure Transfer Protocol (3)

Figure 6:
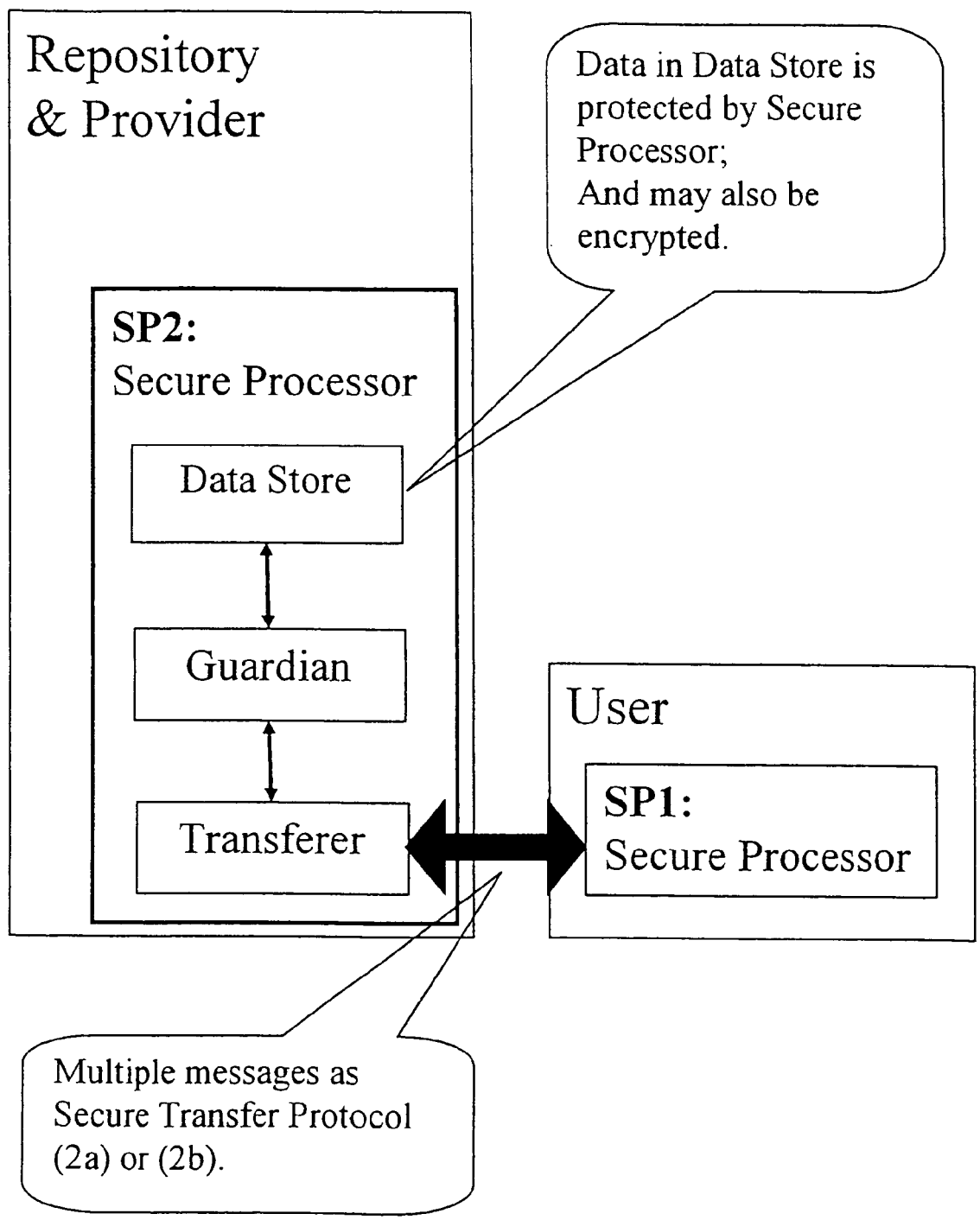
FIG. 6 illustrates an alternative implementation of repository and provider.
Figure 7:
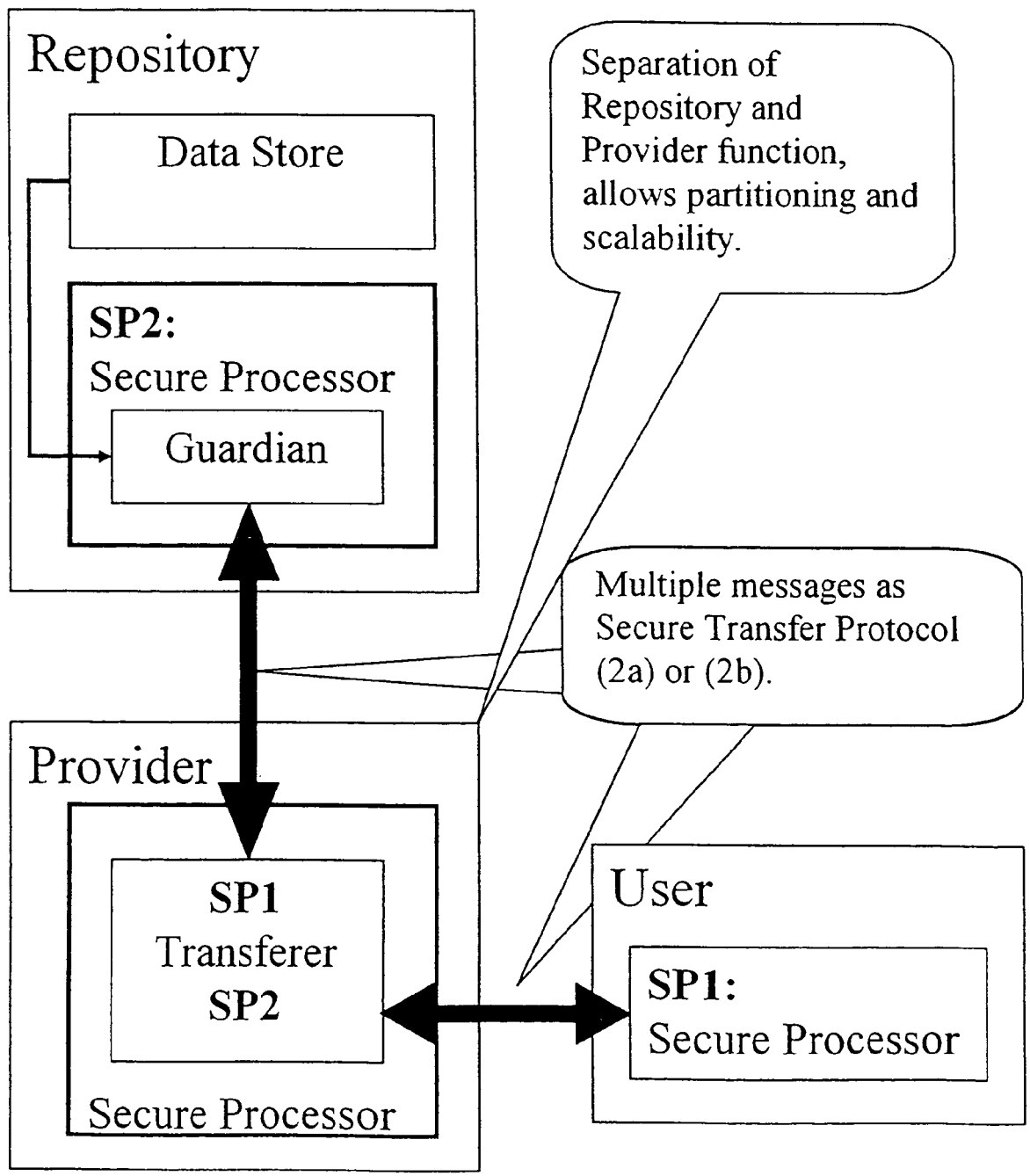
FIG. 7 illustrates yet another implementation of repository and provider.

In this scenario, there are new uses of the Secure Transfer Protocol (1) and (2), (1.8) and (1.9), where:
  a) As shown in FIG. 5, SP2 is the Secure Processor in the combined Repository and Provider and SP1 is Secure Processor in a User;
  b) As shown in FIG. 6, SP2 is the Secure Processor in the Repository and SP1 is the Secure Processor in the User, and the Provider (not separately shown) is an Insecure Processor that simply relays messages between the User and Repository.
  c) Also as shown in FIG. 7, SP2 is the Secure Processor in the Provider and SP1 is the Secure Processor in the User.
  d) As shown in FIG. 7, SP2 is the Secure Processor in the Repository and SP1 is the Secure Processor in the Provider;

In case (a) and (b), the protocol is the same as Secure Transfer Protocol (1), (1.8), or Secure Transfer Protocol (2), (1.9), except that during Step (6.), the now Guardian retrieves the Data based on the RequestedName.

Typically cases (c) and (d) are used together (FIG. 7).

In case (c), (FIG. 7) the protocol Secure Transfer Protocol is the same as Secure Transfer Protocol (1), or (2), but during Step (6.) the Transferer
either:
  c1) initiates an exchange of type (d) to retrieve the Data or Encrypted Data based on the RequestedName from the User
  or;
  c2) retrieves Data or Encrypted Data that originated from a previous exchange of type (d), from a store under its control.

In the case of Encrypted Data, the Transferer may or may not choose to decrypt it.

3. THIRD SCENARIO

In this section we define a framework that extends scenario 2 to support Policies that execute in Secure Processors which automate the enforcement of rules on the processing and distribution.

3.1 DataSet and Policy

Figure 8:
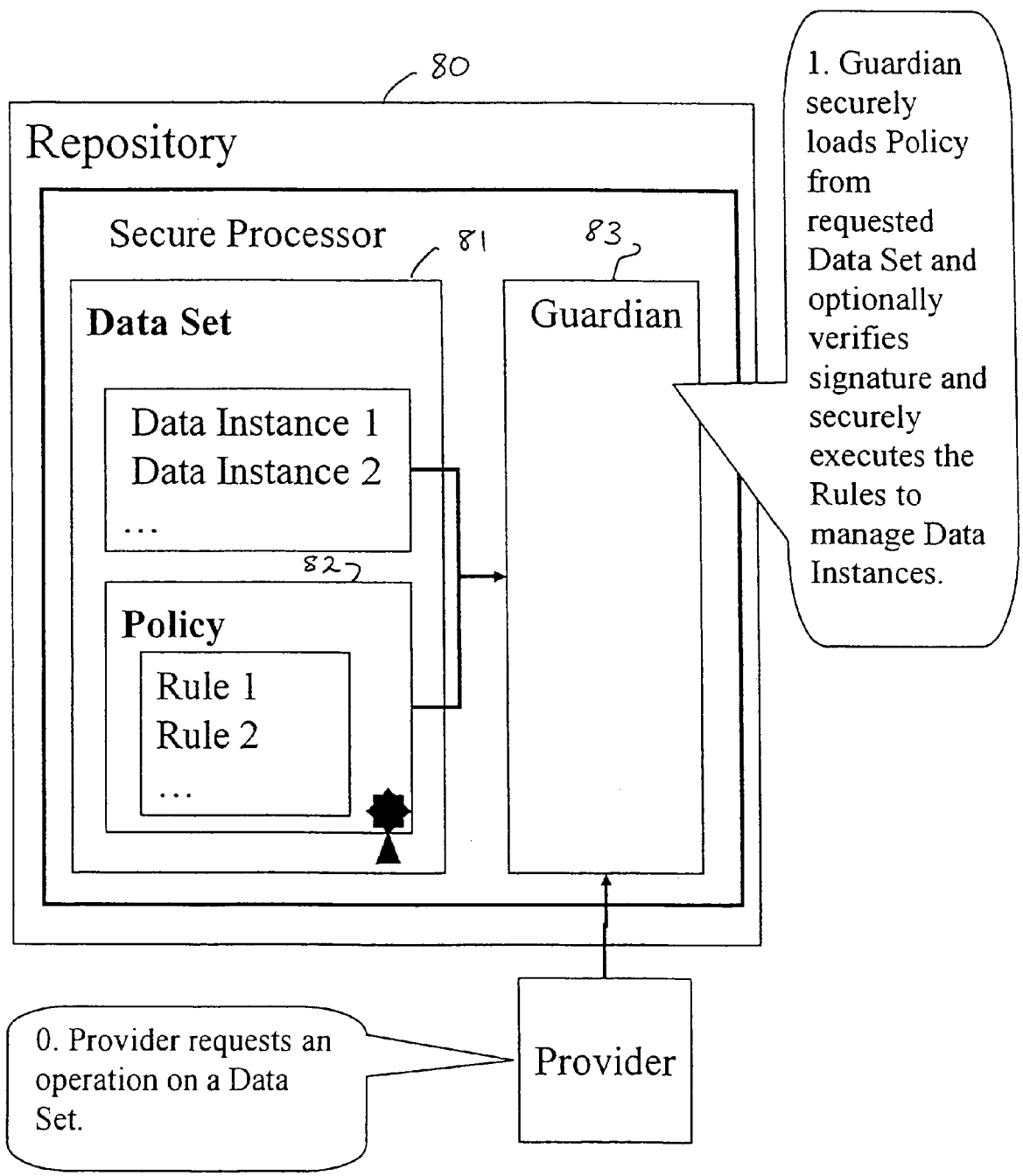
FIG. 8 shows how data-sets and policies may be stored.

Turning next to FIG. 8, a Repository 80 can store Data grouped into one or more DataSet(s) 81.

A DataSet contains one or more versions of Data that are logically related to one another, each being called a Data Instance,
  for example Data Instance 1, Data Instance 2, etc.

For example, a DataSet 81 can contain various versions of a given logical cryptographic key, distinguished and indexed by date of creation, version number, or some other characteristic.

A DataSet 81 is associated with a Policy 82, which contains rules that describe how to manipulate the Data Instances that the DataSet contains and the DataSet itself.

A Policy runs as, or is interpreted by, part of a Secure Program.

When a Policy 82 runs on the Repository 80 it executes as part of the Guardian 83.

For example, the Policy could contain rules that the Guardian runs at certain times during the lifetime of the DataSet, for example, at creation of Data in the DataSet; at each time Data is requested from the DataSet; at certain times of the day.

The Policy could also describe how to determine the current version of the Data in a DataSet, or what to do when Data in a DataSet becomes out of date.

The Policy could also contain rules about the key lengths, algorithms, and its access control lists, and other data, which are used as a template when creating a Key Instance; and similarly on Program Data and Other Data.

A Policy is typically signed by the object that is responsible for it, to ensure its authenticity and integrity. If so, a Policy is used only when this signature has been verified.

The Policy could be transferred as Other Data with the Secure Transfer Protocol, or some other means, to execute or be interpreted on another Secure Processor.

3.2 Region

We turn now to FIG. 9. A Guardian 90 partitions the objects for which it is responsible into one or more domains, called 'Region'(s) 91, such that each object exists in only one Region.

A Region 91 contains:
  one or more Entity(ies) 92 (each a secure processor)that can make requests of the associated Repository or Provider;
  zero or more Policies 93, which define the rules that a DataSet and or objects in the Region must obey;
  zero or more DataSets 94.

Each region could, here, be representative of a particular logical or legal unit, for example, a company or organisation. Alternatively, a region could represent a geographical region, for example individual states within the US which require characterisation by different computer processes because of their differing local laws.

3.3 Entity Name and Enrollment

An Entity has an Entity Name to identify it in a Region.

In this case, the Enrolling process case (b) in Section (1.7) is augmented so that the Secure Processor that is enrolling passes to the Guardian with integrity:
  {Entity Name, Kei-public}

The guardian has an asymmetric key pair, {'Kroot-private', 'Kroot-public'} and constructs an 'Entity Certificate':
  sign({Entity Name, Kei-public, other data}, Kroot-private)

A Relying Party, for example, the Guardian, a Transferer, or a Secure Processors executing a Policy, that needs to rely on the association between the Entity Name and its Kei-public, or the integrity of information originated by the Entity, can request an Entity Certificate from the Guardian.

A Relying Party can then authenticate a message that the Entity called Entity Name, which they have signed with Kei-private, using Kei-public from the Entity Name's Certificate, obtained from the Guardian.

For example, the binding of an Entity name to a kei-public is useful when defining policies, for instance it allows a security officer to specify by name which entities are allowed to use which application keys.

3.4 Secure Transfer Protocol (4)

We turn now to FIG. 10. This instance of the protocol is the same as in Secure Transfer Protocol (3), (2.2), with these differences:

a) During Step (4.), the Guardian or the Transferrer confirms that the Entity associated with Kei-public is still a member of the Region and that its Kei-public is still available from the Guardian.

If so, it continues with the protocol; if not, it exists to Step (9.) with an error.

b) During Step (6.), the Guardian or Transferer retrieves the Data as follows:

6.1) Find the DataSet, 'DS1', that corresponds to the RequestedName.

6.2) Find the Policy in DS1, 'Policy1' that corresponds to selecting Data Instance from the DataSet using RequestedName.

6.3) Execute Policy 1 in the Guardian to extract Data from the appropriate Data Instance.

4. FOURTH SCENARIO

In this situation we define a framework that extends scenario 3 to separate trust, including confidentiality and integrity, between parts of the framework.

4.1 Authority Group

The concept of the Authority Group is illustrated in FIG. 11. In addition to the objects defined in (3.), a Region can contain one or more Authority Group(s) 110, each of which is a collection of Entities which is permitted, or denied, access or privilege. Where for example a Region is representative of a company, the Authority Groups within that Region may be representative of specific groups of people who are authorised to see individual projects that they are working on. Groups may typically be used to define what individuals are allowed to see, and also what they are allowed to do (e.g. by means of given cryptographic keys). Groups may be overlapping, in the sense that an individual user may belong to one or more groups.

Whenever the Guardian or Transferer is requested by an Entity to perform a function, it confirms whether there is an Authority Group 110, of which the Entity is a member, that allows or denies the operation.

For example, a User, with Entity Name 'EN1' in Authority Group 'AG1' may request Data with Requested Name 'RN1'.

Before the Guardian retrieves the DataSet corresponding to RN1, it does the following:

1. Retrieve all Authority Groups that contain EN1;
2. Retrieve from these the Authority Group, AG1, that gives EN1 the right to download the DataSet associated with RN1.
3. Confirm that EN1's rights apply in the current context, for example, by running some associated Policy.
4. Only if all these steps are successful, does the Guardian retrieve the Data associated with RN1 and send it to SP1.

4.2 Region Authority Group

The concept of the Region Authority Group is illustrated in FIG. 12. The Region Authority Group 121 is an administrative group which may be solely responsible for creating and deleting the Region's DataSets; and for maintaining the Policies associated with a DataSet.

In the case when these Policies are signed, they are typically signed by the Region Authority Group, using 'Kgi-private'.

The Regional Authority Group 121 may be responsible for enrolling an Entity into the Region, for authorizing a new Authority Group, or adding an Entity to an Authority Group.

An Authority Group may have the exclusive right to use a given DataSet, in conformance with its associated Policies.

4.3 Revocation

FIG. 13 shows how a Region Authority Group can revoke an Entity from a Region.

In this case, the Region Authority Group 131:

1. removes the Entity from the Region;
2. removes the associated Kei-public and Entity Certificate from the Repository.

As described and shown in FIG. 13, it will be clear that there is a close binding, here, between the act of revoking and its effect on an individual entity. In traditional PKI systems, there is no close link between the reliant party and the issuer of a certificate, as a result of which there is normally a time lag on revocation. With the structure shown in FIG. 13, the repository is responsible for the certificates and also holds the mapping between the entity name and the public key. It can therefore very rapidly decide, if requested to do so, to revoke the privileges of any particular entity.

It should be appreciated that the Guardian holds the public key privately, so that no-one else can send messages to the entity. This is entirely different from the PKI system, where the public key is—by definition—public.

In practice, the Guardian obtains the entities public key via some sort of private secure route. For example, where the entity is an office telephone, it may be enrolled to the Guardian in a secure room within the IT department. Alternatively, the information needed to be passed between the Guardian and the entity to effect enrollment may be done in some other secured way, including for example via physical documentation being passed through a company's internal mail system.

4.4 Group Confidentiality

One particular aspect of an Authority Group is that it could keep its Data and/or Policies private from Entities in other Authority Groups and, in particular, from the Repository and Provider.

We call Data that is protected in this way Group Encrypted Data.

To this end, an Authority Group 141 has:

a) a Group Confidentiality Key symmetric key 142 ('Kgc-secret' for short) or;

b) a Group Confidentiality Key Pair asymmetric key pair ('Kgc-private', Kgc-public').

c) The Repository receives Group Encrypted Data 143, which is placed there by an out-of-band process.

Group Encrypted Data is encrypted using either:

a) encrypt({Data, other data}, Kgc-secret )

or;

b) encrypt({Data, other data), Kgc-public )

A special case is where a Group contains one and only one Entity.

4.5 Secure Transfer Protocol (5)

Other instances of the Secure Transfer Protocol are the same as cases (a) and (b) in Secure Transfer Protocol (3), (2.2), or Secure Transfer Protocol (4), (3.4), where Ke-decrypt is a) Kgc-secret; or b) Kgc-private and Kw-encrypt is a) Kec-secret; or b) Kec-public.

The invention claimed is:

1. A method for the secure transmission of data from a distributor to a client over a computer network, the method comprising:
   (a) encrypting the data using an encryption confidentiality key known to the client but not the distributor;
   (b) storing the encrypted data at the distributor;
   (c) generating a message by further encrypting the encrypted data using an encryption transmission key, the corresponding transmission decryption key being known to the client; and
   (d) transmitting the message to the client,
   wherein said client is adapted to use cryptographic keys but not to generate them, instead requesting a key from the distributor as required.

2. A method as claimed in claim 1 in which, on receipt of the message, the client confirms the integrity of the transmission by decrypting the message using the transmission key.

3. A method as claimed in claim 2 in which the client confirms the confidentiality of the data by decrypting the encrypted data using a confidentiality decryption key corresponding to the confidentiality encryption key.

4. A method as claimed in claim 1 in which the data comprises or includes a cryptographic key.

5. A method as claimed in claim 1 in which the data comprises or includes a program.

6. A method as claimed in claim 1 in which the data comprises or includes license or configuration information.

7. A method as claimed in claim 1 in which the distributor provides key management functions, for example key generation, for the client.

8. A method as claimed in claim 1 in which the distributor comprises a repository in communication with a plurality of providers, each provider being responsible for sending messages to one of a plurality of clients.

9. A method as claimed in claim 8 in which encrypted data held within the repository is divided into data sets, each data set being associated with a respective policy which defines how the data within the data set may be used.

10. A method as claimed in claim 9 in which data from a particular data set, when sent by the provider, is accompanied by the respective policy.

11. A method as claimed in claim 10 in which the policy is run by the provider.

12. A method as claimed in claim 9 in which the policy is run by the client.

13. A method as claimed in claim 9 in which the policy is run by the repository.

14. A method as claimed in claim 8 in which a plurality of regions are defined within the repository, each region containing information on the secure computers that are permitted to make requests for or otherwise manipulate data held by the repository.

15. A method as claimed in claim 14 in which encrypted data held within the repository is divided into data sets, each data set being associated with a respective policy which defines how the data within the data set may be used and in which each region further includes a plurality of data sets.

16. A method as claimed in claim 14 in which encrypted data held within the repository is divided into data sets, each data set being associated with a respective policy which defines how the data within the data set may be used and in which each region is associated with a respective region policy which defines how the information within the region may be used.

17. A method as claimed in claim 14 in which encrypted data held within the repository is divided into data sets, each data set being associated with a respective policy which defines how the data within the data set may be used and in which each region further contains one or more authority groups, the or each group defining a set of secure computers that are permitted to carry out certain tasks.

18. A method as claimed in claim 17 in which a given secure computer may belong to a plurality of authority groups.

19. A method as claimed in claim 17 in which each region includes a region authority group which is responsible for administrative functions relating to its respective region.

20. A method as claimed in claim 19 in which the region authority group is responsible for revoking a secure computer from a region.

21. A method as claimed in claim 17 in which the information within the or each authority group is encrypted and is confidential from the repository.

22. A method as claimed in claim 8 in which the said secure computers include that of the provider.

23. A method as claimed in claim 8 in which the said secure computers include those of the clients.

24. A method as claimed in claim 14 in which the information within the or each authority group is encrypted and is confidential from the provider.

25. A method as claimed in claim 14 in which the information within each authority group, when there is more than one such group, is encrypted and is confidential from other groups.

26. A method as claimed in claim 1 in which the encrypted data is stored in a non-secure part of the repository.

27. A method as claimed in claim 1 in which the providers include respective insecure computers which relay to the users messages generated by the repository.

28. A method as claimed in claim 1 in which the providers include respective secure computers.

29. A method as claimed in claim 1 in which each secure computer within a provider generates messages using a cryptographic key obtained from the repository.

30. A computer security module having means for receiving from a sender a message comprising twice-encrypted data, means for confirming the integrity of the message by decrypting it according to a protocol known to both the module and the sender, and means for confirming that the confidentiality of the data has been preserved by further decrypting the decrypted message using a secret known to the module but not to the sender.

31. A computer system including a plurality of clients, each having a security module as claimed in claim 30, and a provider arranged to send messages, as required, to the said clients.

32. A computer system as claimed in claim 31 in which the provider includes a secure computer.

33. A computer system as claimed in claim 32 in which the secure computer within the provider includes the security module.

34. A computer system as claimed in claim 31 including a plurality of providers, and a repository arranged to send data, as required, to the said providers.

35. A computer system as claimed in claim 31 in which encrypted data is stored at the provider, and is re-encrypted prior to being sent as a message to the client.

36. A computer system as claimed in claim 34 in which encrypted data is stored at the repository, and is re-encrypted prior to being sent as messages to the providers.

37. A computer system as claimed in claim 34 in which the providers comprise respective insecure computers which relay to the users messages generated by the repository.

38. A computer system as claimed in claim 34 in which encrypted data held within the repository is divided into data sets, each data set being associated with a respective policy which defines how the data within the data set may be used.

39. A computer system as claimed in claim 38 in which data from a particular data set, when sent by the provider, is accompanied by the respective policy.

40. A computer system as claimed in claim 39 in which the policy is run by the provider.

41. A computer system as claimed in claim 39 in which the policy is run by the client.

42. A computer system as claimed in claim 38 in which the policy is run by the repository.

43. A computer system as claimed in 30 in which encrypted data is stored in a non-secure part of the repository.

44. A computer system as claimed in claim 34 in which a plurality of regions are defined with the repository, each region containing information on the secure computers that are permitted to make requests for or otherwise manipulate data held by the repository.

45. A computer system as claimed in claim 44 in which the said secure computers include that of the provider.

46. A computer system as claimed in claim 44 in which, on receipt of the message, the client confirms the integrity of the transmission by decrypting the message using the transmission key and in which the said secure computers include those of the clients.

47. A computer system as claimed in claim 44 in which encrypted data held within the repository is divided into data sets, each data set being associated with a respective policy which defines how the data within the data set may be used and in which each region further includes a plurality of data sets.

48. A computer system as claimed in claim 44 in which each region is associated with a respective region policy which defines how the information within the region may be used.

49. A computer system as claimed in claim 44 in which each region further contains one or more authority groups, the or each group defining a set of secure computers that are permitted to carry out certain tasks.

50. A computer system as claimed in claim 49 in which a given secure computer may belong to a plurality of authority groups.

51. A computer system as claimed in claim 49 in which each region includes a region authority group which is responsible for administrative functions relating to its respective region.

52. A computer system as claimed in claim 51 in which the region authority group is responsible for revoking a secure computer from a region.

53. A computer system as claimed in claim 49 in which the information within the or each authority group is encrypted and is confidential from the repository.

54. A computer system as claimed in claim 49 in which the information within the or each authority group is encrypted and is confidential from the provider.

55. A computer system as claimed in claim 49 in which the information within each authority group, when there is more than one such group, is encrypted and is confidential from the other group.

56. A method for the secure transmission of data to a client, over a computer network, the method comprising:

(a) providing, at a remote data distributor, encrypted data the decryption of which requires knowledge of a secret known to the client;

(b) opening a secure channel between the distributor and the client, the channel defining a cryptographic protocol agreed by both the distributor and client;

(c) at the distributor, further encrypting the encrypted data according to the protocol to generate a secure message, and transmitting the message to the client; and (d) at the client:

(i) confirming the integrity of the transmission by decrypting the message according to the protocol; and (ii) recovering the data by decrypting the encrypted data using the secret.

57. A method as claimed in claim 56 in which the data comprises or includes a cryptographic key.

58. A method as claimed in claim 57 in which the distributor provides key management functions, for example key generation, for the client.

59. A method as claimed in claim 57 in which the client is adapted to use cryptographic keys but not to generate them, instead requesting a key from the distributor as required.

60. A method as claimed in claim 57 in which the key is used in a secure process by the client.

61. A method as claimed in claim 56 in which the data comprises or includes a program.

62. A method as claimed in claim 56 in which the data comprises or includes license or configuration information.

63. A method as claimed in any one of claim 56 in which the secret known to the client is not known to the distributor.

64. A method as claimed in claim 63 in which the distributor generates the message by calculating encrypt (wrap( (Ke-decrypt), Kw-wrap), Ks) where:

(i) wrap (a,b) denotes 'wrap key a with key b', (ii) Ke-decrypt is the decryption key corresponding to an encryption key Ke-encrypt with which the data was encrypted, (iii) Ks is a session key generated according to the said protocol, and (iv) Kw-wrap is a wrapping key.

65. A method as claimed in claim 64 in which the client has a symmetric entity confidentiality key, Kec-secret, which has been securely transferred in advance to the distributor, the distributor then using Kec-secret as Kw-wrap.

66. A method as claimed in claim 64 in which the client has an asymmetric entity confidentiality key pair, Kec-public/Kec-private, Kec-public having been securely transferred in advance to the distributor, the distributor then using Kec-public as Kw-wrap.

67. A method as claimed in claim 63 in which the distributor generates the message by calculating Encrypt (B,Ks) where: B has been received by the distributor in advance by some secure process, B being defined by wrap ({Ke-decrypt}, Kw-wrap) where:

(i) wrap (a,b) denotes 'wrap key a with key b',
(ii) Ke-decrypt is the decryption key corresponding to an encryption key Ke-encrypt with which the data was encrypted,
(iii) Ks is a session key generated according to the said protocol, and
(iv) Kw-wrap is a wrapping key.

68. A method as claimed in claim 63 in which the message generation includes wrapping the encrypted data with a symmetric entity confidentiality key which has been securely transferred in advance to the distributor.

69. A method as claimed in claim 68 in which the distributor holds the said public part of the key pair confidential.

70. A method as claimed in claim 63 in which the message generation includes wrapping the encrypted data with the public part of an asymmetric entity confidentiality key pair, the said public part having been securely transferred in advance to the distributor.

* * * * *